United States Patent
Tang

(10) Patent No.: US 11,012,971 B2
(45) Date of Patent: May 18, 2021

(54) PAGING METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 220 days.

(21) Appl. No.: 16/329,635

(22) PCT Filed: Jan. 31, 2018

(86) PCT No.: PCT/CN2018/074836
§ 371 (c)(1),
(2) Date: Feb. 28, 2019

(87) PCT Pub. No.: WO2019/148398
PCT Pub. Date: Aug. 8, 2019

(65) Prior Publication Data
US 2021/0058892 A1 Feb. 25, 2021

(51) Int. Cl.
*H04W 68/02* (2009.01)
*H04W 68/00* (2009.01)

(52) U.S. Cl.
CPC .................. *H04W 68/005* (2013.01)

(58) Field of Classification Search
CPC ... H04W 68/00; H04W 68/005; H04W 68/02; H04W 68/025; H04W 68/06; H04W 68/10
See application file for complete search history.

(56) References Cited

U.S. PATENT DOCUMENTS

| 10,123,365 B2* | 11/2018 | Baek | H04W 68/00 |
| 2016/0381700 A1 | 12/2016 | Lee et al. | |
| 2019/0029000 A1* | 1/2019 | Vikberg | H04W 68/02 |
| 2019/0037531 A1* | 1/2019 | Pantus | H04W 68/00 |
| 2019/0230725 A1* | 7/2019 | Lou | H04W 76/27 |

FOREIGN PATENT DOCUMENTS

| CN | 106211328 A | 12/2016 |
| CN | 106993329 A | 7/2017 |
| CN | 107231665 A | 10/2017 |

(Continued)

OTHER PUBLICATIONS

PCT/CN2017/097108, filed on Aug. 11, 2017 and published on Feb. 14, 2019 (Year: 2019).*

(Continued)

*Primary Examiner* — Siu M Lee
(74) *Attorney, Agent, or Firm* — Ladas & Parry LLP

(57) ABSTRACT

The disclosure provides a paging method, a network device and a terminal device. The method includes that: a network device sends a paging message to a terminal device based on at least one network slice used by the terminal device. Accordingly, the network device pages the terminal device based on the network slice of the terminal device, which, compared with simultaneous paging of all network slices, may reduce a paging signaling overhead and avoid the terminal device frequently reading paging messages which do not belong to it.

13 Claims, 2 Drawing Sheets

(56) References Cited

FOREIGN PATENT DOCUMENTS

| CN | 107404759 A | 11/2017 |
| WO | 2016201674 A1 | 12/2016 |
| WO | 2016205997 A1 | 12/2016 |
| WO | 2017135856 A1 | 8/2017 |
| WO | 2017135857 A1 | 8/2017 |

OTHER PUBLICATIONS

Supplementary European Search Report in the European application No. 18845431.8, dated Aug. 12, 2019.

Samsung: "RAN Design Issues for Supporting Slicing", 3GPP Draft; R2-165277, 3rd Generation Partnership Project (3GPP), Mobile Competence Centre ; 650, Route Des Lucioles ; F-06921 Sophia-Antipolis Cedex ; France, vol. RAN WG2 , no. Gteborg; Aug. 22, 2016-Aug. 26, 2016 Aug. 16, 2016 (Aug. 16, 2016), XP051142858, Retrieved from the Internet: URL:http://www.3gpp.org/ftp/tsg_ran/WG2_RL2/TSGR2_95/Docs/ [retrieved on Aug. 16, 2016]*paragraph [02.2]* * paragraph[02.3]*.

NEC: "Slice Impacts on Mobility: Further considerations", 3GPP Draft; R3-170138_Sliceconnectedmobility-V05, 3rd Generation Partnership Project (3GPP), Mobile Competence Centre; 650, Route Des Lucioles ; F-06921 Sophia-Antipolis Cedex ; France, vol. RAN WG3 , no. Spokane, Wa; Jan. 17, 2017-Jan. 19, 2017 Jan. 12, 2017 (Jan. 12, 2017), XP051212878, Retrieved from the Internet: URL:http://www.3gpp.org/ftp/Meetings_3GPP_SYNC/RAN3/Docs/ [retrieved on Jan. 12, 2017]* paragraph [02.1]*.

Sequans Communications: "Cell reselection upon incoming service request", 3GPP Draft; R2-1801178—Cell Reselection Upon Incoming Service Request, 3rd Generation Partnership Project (3GPP), Mobile Competence Centre; 650, Route Des Lucioles; F-06921 Sophia-Antipolis Cedex; France, vol. RAN WG2 , no. Vancouver, Canada; Jan. 22, 2018-Jan. 26, 2018 Jan. 11, 2018 (Jan. 11, 2018), XP051385895.

Internetional Search Report in the internationalpplication No. PCT/CN2018/074836, dated Oct. 23, 2018.

International Search Report in international application No. PCT/CN2018/074836, dated Oct. 23, 2018.

Written Opinion of the International Search Authority in international application No. PCT/CN2018/074836, dated Oct. 23, 2018.

Notice of Allowance of the Chinese application No. 201860003461.0, dated Apr. 26, 2020.

* cited by examiner

PAGING METHOD AND DEVICE

RELATED APPLICATION

This application is an application under 35 U.S.C. 371 of International Application No. PCT/CN2018/074836 filed on Jan. 31, 2018, the entire contents of which are incorporated herein by reference.

TECHNICAL FIELD

Embodiments of the disclosure relate to the field of communication, and more particularly to a paging method and a device.

BACKGROUND

In a Long Term Evolution (LTE) system, a paging message is transmitted at a Paging Occasion (PO) in a Paging Frame (PF). In a New Radio (NR) system, a terminal device may support multiple network slices. Therefore, how to implement paging message transmission of a terminal device based on a network slice of the terminal device becomes a problem urgent to be solved.

SUMMARY

The embodiments of the disclosure provide a paging method and a device, which may implement paging message transmission of a terminal device based on a network slice of the terminal device.

A first aspect provides a paging method, which may include that: a network device sends a paging message to a terminal device based on at least one network slice used by the terminal device.

Accordingly, the network device pages the terminal device based on the network slice of the terminal device, which, compared with simultaneous paging of all network slices, may reduce a paging signaling overhead and avoid the terminal device frequently reading paging messages which do not belong to it.

In a possible implementation, the network device may be a core network device, and the operation that the network device sends the paging message to the terminal device based on the at least one network slice used by the terminal device may include that: responsive to that a delay requirement is lower than a threshold value, the core network device determines a first network slice, for which paging is to be firstly performed, of the at least one network slice used by the terminal device, and sends the paging message to the terminal device through an access network device supporting the first network slice firstly.

Accordingly, the core network device, when paging the terminal device, selects the network slice to be firstly paged from the at least one network slice used by the terminal device and pages the terminal device through the access network device supporting the network slice firstly. Therefore, paging efficiency may be improved, and the paging signaling overhead may be reduced.

In a possible implementation, the method may further include that: the core network device sends the paging message to the terminal device through an access network device which supports a second network slice and does not support the first network slice.

In a possible implementation, the first network slice may be a network slice supported by an access network device where the terminal device establishes a latest service, a network slice supported by an access network device where the terminal device is located after area updating, or a network slice with a highest priority.

In a possible implementation, the network device may be the core network device, and the operation that the network device sends the paging message to the terminal device based on the at least one network slice used by the terminal device may include that: responsive to that the delay requirement is higher than a threshold value, the core network device sends paging messages to the terminal device simultaneously through access network devices supporting the at least one network slice.

In a possible implementation, the network device may be an access network device, and the operation that the network device sends the paging message to the terminal device based on the at least one network slice used by the terminal device may include that: the access network device determines at least one paging group to which the terminal device belongs and which corresponds to the at least one network slice based on the at least one network slice used by the terminal device and corresponding relationship between multiple network slices and multiple paging groups; and the access network device sends the paging message to the terminal device based on the paging group to which the terminal device belongs.

In a possible implementation, the operation that the access network device sends the paging message to the terminal device based on the paging group to which the terminal device belongs may include that: the access network device selects a target paging group to be paged from the at least one paging group, and sends the paging message to a terminal device of the target paging group.

The method may further include that: the access network device sends indication information to the terminal device, the indication information indicating the target paging group.

Accordingly, the access network device, when paging the terminal device, selects the network slice to be firstly paged from the at least one network slice used by the terminal device, sends the paging message to the terminal device supporting the network slice firstly, and indicates the network slice to the terminal device through the indication information, and then the terminal device, when judging that it supports the network slice indicated by the indication information, receives the paging message for the network slice from the network device. Therefore, when POs for terminal devices using different slices are overlapped, the terminal devices may still determine whether their own paging messages are sent or not, and the paging messages which do not belong to them are prevented from being frequently read.

In a possible implementation, POs when the access network device sends paging messages to terminal devices in different paging groups may be different.

In a possible implementation, the POs when the access network device sends the paging messages to the terminal devices in different paging groups may be the same.

In a possible implementation, the POs when the access network device sends paging messages to terminal devices with different identifiers may be different.

In a possible implementation, the method may further include that: the access network device sends system information to the terminal device, the system information containing the corresponding relationship between the multiple paging groups and the multiple network slices.

In a possible implementation, responsive to that the corresponding relationship for multiple cells of the access network device is the same, the system information may further include information of the multiple cells.

A second aspect provides a paging method, which may include that: a terminal device receives a paging message sent by an access network device based on at least one network slice used by the terminal device.

Accordingly, the terminal device receives the paging message sent by the network device based on the network slice used by it, which, compared with reception of the paging message simultaneously sent to all network slices by the network device, may reduce a paging signaling overhead and avoid the terminal device frequently reading paging messages which do not belong to it.

In a possible implementation, the operation that the terminal device receives the paging message sent by the access network device based on the at least one network slice used by the terminal device may include that: the terminal device determines at least one paging group to which the terminal device belongs and which corresponds to the at least one network slice based on the at least one network slice used by the terminal device and corresponding relationship between multiple network slices and multiple paging groups; the terminal device receives indication information sent by the access network device, the indication information indicating a target paging group of the at least one paging group; and the terminal device receives the paging message sent by the access network device, the paging message being a paging message sent to a terminal device of the target paging group by the access network device.

Accordingly, in the embodiments, the access network device selects a network slice to be firstly paged, sends the paging message to the terminal device supporting the network slice and simultaneously indicates the network slice. Therefore, when the network slice used by the terminal device includes the slice indicated by the access network device, the paging message sent by the access network device is detected, and then the terminal device may receive the paging message based on different network slices used by it and is prevented from frequently reading paging messages which do not belong to it.

In a possible implementation, POs when terminal devices in different paging groups receive paging messages from the access network device may be different.

In a possible implementation, the POs when the terminal devices in different paging groups receive the paging messages sent by the access network device may be the same.

In a possible implementation, POs when terminal devices with different identifiers receive paging messages from the access network device may be different.

In a possible implementation, the method may further include that: the terminal device receives system information from the access network device, the system information containing the corresponding relationship between the multiple paging groups and the multiple network slices.

In a possible implementation, responsive to that the corresponding relationship for multiple cells of the access network device is the same, the system information may further include information of the multiple cells.

A third aspect provides a network device, which may execute operations of a first node in the first aspect or any optional implementation of the first aspect. Specifically, the network device may include modular units configured to execute the operations of the network device in the first aspect or any possible implementation of the first aspect.

A fourth aspect provides a terminal device, which may execute operations of a first node in the second aspect or any optional implementation of the second aspect. Specifically, the terminal device may include modular units configured to execute the operations of the terminal device in the second aspect or any possible implementation of the second aspect.

A fifth aspect provides a network device, which includes a processor, a transceiver and a memory. Herein, the processor, the transceiver and the memory may communicate with one another through an internal connecting path. The memory is configured to store an instruction, and the processor is configured to execute the instruction stored in the memory. When the processor executes the instruction stored in the memory, such execution enables the network device to execute the method in the first aspect or any possible implementation of the first aspect, or such execution enables the network device to implement the network device provided in the third aspect.

A sixth aspect provides a terminal device, which includes a processor, a transceiver and a memory. Herein, the processor, the transceiver and the memory may communicate with one another through an internal connecting path. The memory is configured to store an instruction, and the processor is configured to execute the instruction stored in the memory. When the processor executes the instruction stored in the memory, such execution enables the terminal device to execute the method in the second aspect or any possible implementation of the second aspect, or such execution enables the terminal device to implement the terminal device provided in the fourth aspect.

A seventh aspect provides a system chip, which includes an input interface, an output interface, a processor and a memory. The processor is configured to execute an instruction stored in the memory. When the instruction is executed, the processor may implement the method in the first aspect or any possible implementation of the first aspect.

An eighth aspect provides a system chip, which includes an input interface, an output interface, a processor and a memory. The processor is configured to execute an instruction stored in the memory. When the instruction is executed, the processor may implement the method in the second aspect or any possible implementation of the second aspect.

A ninth aspect provides a computer program product including an instruction, which runs on a computer to enable the computer to execute the method in the first aspect or any possible implementation of the first aspect.

A tenth aspect provides a computer program product including an instruction. When the computer program runs on a computer, the computer program enable the computer to execute the method in the second aspect or any possible implementation of the second aspect.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
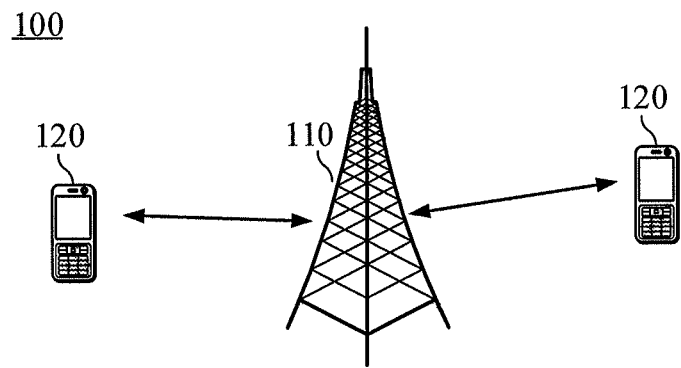
FIG. 1 is a schematic architecture diagram of an application scenario according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. In one or more embodiments, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 located within the coverage of the network device 110. The terminal devices 120 may be mobile or fixed. In one or more embodiments, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In one or more embodiments, the terminal devices 120 may perform Device to Device (D2D) communication.

In one or more embodiments, the 5G system or network may also be called an NR system or network.

A network device and two terminal devices are exemplarily illustrated in FIG. 1. In one or more embodiments, the wireless communication system 100 may include multiple network devices and another number of terminal devices may be included in coverage of each network device. There are no limits made thereto in the embodiments of the disclosure.

In one or more embodiments, the wireless communication system 100 may further include another network entity such as a network controller and a mobility management entity. There are no limits made thereto in the embodiments of the disclosure.

In an NR system, a terminal device may support multiple network slices, and paging for each network slice may bring a high paging signaling overhead. In addition, if POs for paging messages for different network slices are the same, the terminal device may frequently read Downlink Control Information (DCI) and even paging messages which do not belong to it.

In the embodiments of the disclosure, a network device pages a terminal device based on a network slice of the terminal device, thereby reducing a paging signaling overhead and avoiding the terminal device frequently reading paging messages which do not belong to it.

Figure 2:
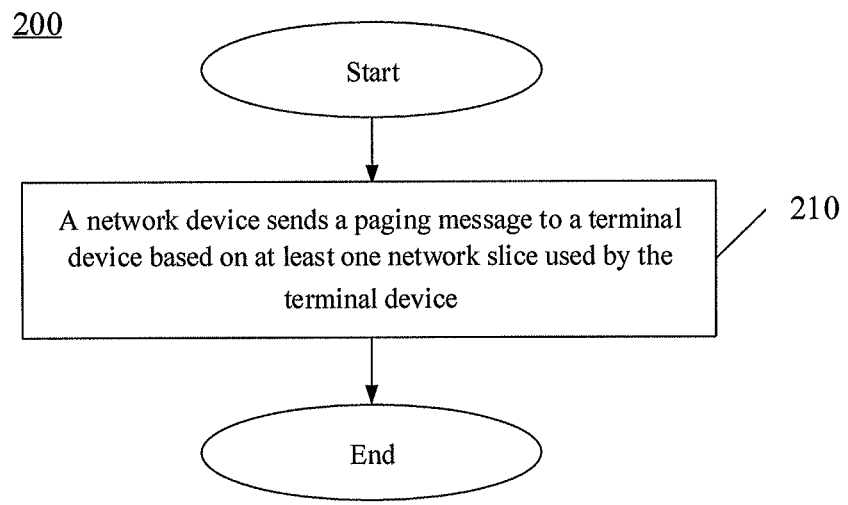
FIG. 2 is a schematic flowchart of a paging method according to an embodiment of the disclosure.

FIG. 2 is a schematic flowchart of a paging method according to an embodiment of the disclosure. A network device illustrated in FIG. 2 may be, for example, a network device 110 illustrated in FIG. 1. The network device may be an access network device such as a base station, or a core network device such as an Access and Mobility Management Function (AMF). As illustrated in FIG. 2, the paging method 200 includes the following operation.

In 210, the network device sends a paging message to a terminal device based on at least one network slice used by the terminal device.

Accordingly, the network device pages the terminal device based on the network slice of the terminal device, which, compared with simultaneous paging of all network slices, may reduce a paging signaling overhead, avoid the terminal device frequently reading paging messages which do not belong to it and reduce power consumption of the terminal device.

In the embodiment of the disclosure, the network slice is also called a slice for short. The slice may be a slice of any one of the following types: an Enhance Mobile Broadband (eMBB) slice, an Ultra Reliable and Low Latency Communication (URLLC) slice and an Internet of Things (IoT) slice.

210 will be described below for two scenarios respectively.

A first scenario The network device is a core network device. That is, a core network side is optimized.

In one or more embodiments, the operation in 210 that the network device sends the paging message to the terminal device based on the at least one network slice used by the terminal device includes that: responsive to that a delay requirement is lower than a threshold value, the core network device determines a first network slice, for which paging is to be firstly performed, of the at least one network slice used by the terminal device, and sends the paging message to the terminal device through an access network device supporting the first network slice firstly.

Or, in one or more embodiments, the operation in 210 that the network device sends the paging message to the terminal device based on the at least one network slice used by the terminal device includes that: responsive to that the delay requirement is higher than a threshold value, the core network device sends paging messages to the terminal device simultaneously through access network devices supporting the at least one network slice.

Accordingly, in the embodiment, the core network device, when paging the terminal device, selects the network slice to be firstly paged from the at least one network slice used by the terminal device and pages the terminal device through the access network device supporting the network slice firstly. Therefore, paging efficiency may be improved, and the paging signaling overhead may be reduced.

In one or more embodiments, the method further includes that: the core network device sends the paging message to the terminal device through an access network device which supports a second network slice and does not support the first network slice.

That is, after the core network device pages the terminal device through the access network device supporting the first network slice, if the terminal device is not paged, the core network device may page the terminal device through the access network device supporting the second network slice.

Herein, if the access network device which supports the first network slice and also supports the second network slice exists in at least one access network device supporting the first network slice, since the paging message has been sent to the terminal device through the access network device during paging for the first network slice, the paging message is not required to be sent to the access network device any more when the terminal device is paged for the second network slice. Therefore, repeated paging is avoided, and the paging signaling overhead is reduced.

Herein, the first network slice for which paging to be firstly performed may be a network slice supported by an access network device where the terminal device establishes a latest service, a network slice supported by an access network device where the terminal device is located after area updating, or a network slice with a highest priority.

The core network device may, for example, acquire the at least one slice supported by the terminal device through slice information of the terminal device for registration in a core network.

The core network device may, for example, acquire the access network device after area updating of the terminal device through an area updating message.

For example, slices, registered in the core network device, of the terminal device include a slice 1, a slice 2 and a slice 3. The core network device is connected with a base station 1, a base station 2 and a base station 3. The base station 1 supports the slice 1, the base station 2 supports the slice 1 and the slice 2, and the base station 3 supports the slice 3. Under some scenarios, for example, for non-emergent paging, the core network device may simultaneously page the terminal device through the base station 1, the base station 2 and the base station 3. That is, the core network simultaneously performs paging for the three slices. Under some other scenarios, for example, for relatively emergent paging, the core network device may select a slice to be firstly paged from the slice 1, the slice 2 and the slice 3. For example, the slice 1 is selected to be firstly paged. In such case, since both of the base station 1 and the base station 2 support the slice 1, the core network device firstly pages the terminal device through the base station 1 and base station 2 supporting the slice 1.

If the terminal device is not paged, the core network device may perform secondary paging. In such case, the paging message may be sent to the base station supporting the slice 2, thereby paging the terminal device through the base station supporting the slice 2. It is to be noted herein that, since the base station 2 supports the slice 1 and also supports the slice 2 and the core network device has firstly paged the terminal device through the base station supporting the slice 1, namely having paged the terminal device through the base station 2, when the core network device is required to perform secondary paging through the base station supporting the slice 2, it is unnecessary to page the base station 2.

Similarly, if the terminal device is still not paged after secondary paging, the terminal device may similarly be paged through the base station 3 supporting the slice 3.

A second scenario

The network device is an access network device. That is, an access network side is optimized.

In one or more embodiments, the operation in 210 that the network device sends the paging message to the terminal device based on the at least one network slice used by the terminal device includes that: the access network device selects a target paging group to be paged in at least one paging group, and sends the paging message to a terminal device of the target paging group.

Herein, the method further includes that: the access network device sends indication information to the terminal device, the indication information indicating the target paging group.

Accordingly, in the embodiment, the access network device, when paging the terminal device, selects the network slice to be firstly paged from the at least one network slice used by the terminal device, sends the paging message to the terminal device supporting the network slice firstly, and indicates the network slice to the terminal device through the indication information, and then the terminal device, when judging that it supports the network slice indicated by the indication information, receives the paging message for the network slice from the network device. Therefore, when POs for terminal devices using different slices are overlapped, the terminal devices may still determine whether their own paging messages are sent or not, and the paging messages which do not belong to them are prevented from being frequently read.

In one or more embodiments, POs when the access network device sends paging messages to terminal devices with different identifiers may be the same or different.

In one or more embodiments, POs when the access network device sends paging messages to terminal devices in different paging groups may be the same or different.

For a PO when the paging message of the terminal device is transmitted, a PF and PO configured to receive the paging message may be calculated according to an identifier (UE-ID) of the terminal device, for example, a truncated International Mobile Subscriber Identification Number (IMSI), and some system broadcast parameters, a Physical Downlink Control Channel (PDCCH) is detected, a Paging Radio Network Temporary Identity (P-RNTI) is adopted for decoding, and then the paging message is received in a Physical Downlink Shared Channel (PDSCH) according to a decoding result. The paging message includes upper-layer identification information, for example, a Temporary Mobile Subscriber Identity (TSMI), of the terminal device, and may enable the terminal device to judge whether a response is required to be made to the paging message sent by the network device or not.

For example, there is made such a hypothesis that a terminal device supporting the slice 1 belongs to a paging group 1 and a terminal device supporting the slice 2 belongs to a paging group 2. A terminal device 1 supports the slice 1 and belongs to the paging group 1, and a terminal device 2 supports the slice 2 and belongs to the paging group 2. If POs calculated by the terminal device 1 and the terminal device 2 and configured to receive paging messages are the same PO, since the access network device performs paging based on the slices supported by the terminal devices, if a present paging message at the PO is a paging message sent to the terminal device in the paging group 1 by the access network device, the terminal device 1, when receiving indication information indicating the paging group 1 from the access network device, finds that it belongs to the paging group 1 and then may detect its own paging message at the PO, and the terminal device 2, when receiving the indication information indicating the paging group 1 from the access network device, finds that it does not belong to the paging group 1 and may not detect its own paging message at the PO. Therefore, the terminal device 2 is prevented from frequently reading the paging message which does not belong to the terminal device.

When the access network device pages the terminal device in the paging group 2, indication information indicating the paging group 2 may be sent. Therefore, the terminal device 2 may detect its own paging message at the PO only when receiving the indication information indicating the paging group 2.

Herein, there are no limits made to a sequence in which the access network device pages the terminal devices in the paging group 1 and the paging group 2 in the disclosure. For example, if a terminal device supports multiple network slices, a terminal device in a paging group corresponding to the network slice with a high priority may be firstly paged according to priorities of the multiple network slices.

In one or more embodiments, the method further includes that: the access network device sends system information to the terminal device, the system information containing a corresponding relationship between multiple paging groups and multiple network slices.

Or, the access network device may also configure the corresponding relationship between the paging groups and the network slices for the terminal device through dedicated signaling.

In one or more embodiments, responsive to that the corresponding relationship for multiple cells of the access network device is the same, the system information further includes information of the multiple cells.

The terminal device may enter a connected state when entering a cell to acquire the corresponding relationship between the paging groups and the network slices.

Figure 3:
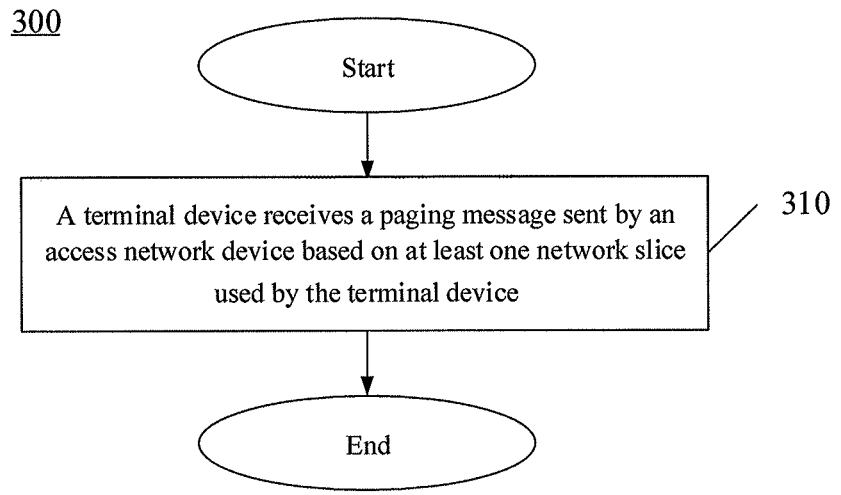
FIG. 3 is a schematic flowchart of a paging method according to another embodiment of the disclosure.

FIG. 3 is a schematic flowchart of a paging method according to an embodiment of the disclosure. A terminal device illustrated in FIG. 3 may be, for example, a terminal device 120 illustrated in FIG. 1. As illustrated in FIG. 3, the paging method 300 includes the following operation.

In 210, the terminal device receives a paging message sent by an access network device based on at least one network slice used by the terminal device.

Accordingly, the terminal device receives the paging message sent by the network device based on the network slice used by it, which, compared with reception of the paging message simultaneously sent to all network slices by the network device, may reduce a paging signaling overhead and avoid the terminal device frequently reading paging messages which do not belong to it.

In one or more embodiments, the operation in 210 that the terminal device receives the paging message sent by the access network device based on the at least one network slice used by the terminal device includes that: the terminal device determines at least one paging group to which the terminal device belongs and which corresponds to the at least one network slice based on the at least one network slice used by the terminal device and corresponding relationship between multiple network slices and multiple paging groups; the terminal device receives indication information sent by the access network device, the indication information indicating a target paging group of the at least one paging group; and the terminal device receives the paging message sent by the access network device, the paging message being a paging message sent to a terminal device of the target paging group by the access network device.

Accordingly, in the embodiments, the access network device selects a network slice to be firstly paged, sends the paging message to the terminal device supporting the network slice and simultaneously indicates the network slice. Therefore, when the network slice used by the terminal device includes the slice indicated by the access network device, the paging message sent by the access network device is detected, and then the terminal device may receive the paging message based on different network slices used by it and is prevented from frequently reading paging messages which do not belong to it.

In one or more embodiments, POs when the access network device sends paging messages to terminal devices with different identifiers may be the same or different.

In one or more embodiments, POs when the access network device sends paging messages to terminal devices in different paging groups may be the same or different.

In one or more embodiments, the method further includes that: the terminal device receives system information from the access network device, the system information containing the corresponding relationship between the multiple paging groups and the multiple network slices.

In one or more embodiments, responsive to that the corresponding relationship for multiple cells of the access network device is the same, the system information further includes information of the multiple cells.

It is to be understood that specific details about a process that the terminal device receives the paging message may refer to descriptions about the network device in FIG. 2 and, for simplicity, no more elaborations will be made herein.

It is also to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The paging method according to the embodiments of the disclosure is described above in detail and a device according to the embodiments of the disclosure will be described below in combination with FIG. 4 to FIG. 7. The technical characteristics described in the method embodiments are applied to the following device embodiments.

Figure 4:
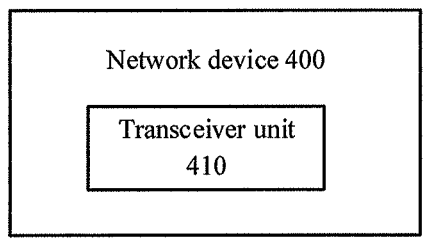
FIG. 4 is a schematic block diagram of a network device according to an embodiment of the disclosure.

FIG. 4 is a schematic block diagram of a network device 400 according to an embodiment of the disclosure. As illustrated in FIG. 4, the network device 400 includes a transceiver unit 410. Herein, the transceiver unit 410 is configured to send a paging message to a terminal device based on at least one network slice used by the terminal device.

Accordingly, the network device pages the terminal device based on the network slice of the terminal device, which, compared with simultaneous paging of all network slices, may reduce a paging signaling overhead and avoid the terminal device frequently reading paging messages which do not belong to it.

In one or more embodiments, the network device is a core network device, and the transceiver unit 410 is specifically configured to, responsive to that a delay requirement is lower than a threshold value, determine a first network slice, for which paging is to be firstly performed, of the at least one network slice used by the terminal device, and send the paging message to the terminal device through an access network device supporting the first network slice firstly.

Accordingly, in the embodiment, the core network device, when paging the terminal device, selects the network slice to be firstly paged from the at least one network slice used by the terminal device and pages the terminal device through the access network device supporting the network slice firstly. Therefore, paging efficiency may be improved, and the paging signaling overhead may be reduced.

In one or more embodiments, the transceiver unit 410 is further configured to send the paging message to the terminal device through an access network device which supports a second network slice and does not support the first network slice.

In one or more embodiments, the first network slice is a network slice supported by an access network device where the terminal device establishes a latest service, a network slice supported by an access network device where the terminal device is located after area updating, or a network slice with a highest priority.

In one or more embodiments, the network device is the core network device, and the transceiver unit 410 is specifically configured to, responsive to that the delay requirement is higher than a threshold value, send, by the core network device, paging messages to the terminal device simultaneously through access network devices supporting the at least one network slice.

In one or more embodiments, the network device is an access network device, the access network device further includes a determination unit, and the determination unit is configured to determine at least one paging group to which the terminal device belongs and which corresponds to the at least one network slice based on the at least one network slice used by the terminal device and corresponding relationship between multiple network slices and multiple paging groups. The transceiver unit 410 is specifically configured to send the paging message to the terminal device based on the paging group to which the terminal device belongs.

In one or more embodiments, the transceiver unit 410 is specifically configured to select a target paging group to be paged from the at least one paging group and send the paging message to a terminal device of the target paging group. The transceiver unit 410 is further configured to send indication information to the terminal device, the indication information indicating the target paging group.

Accordingly, in the embodiment, the access network device, when paging the terminal device, selects the network slice to be firstly paged from the at least one network slice used by the terminal device, sends the paging message to the terminal device supporting the network slice firstly, and indicates the network slice to the terminal device through the indication information, and then the terminal device, when judging that it supports the network slice indicated by the indication information, receives the paging message for the network slice from the network device. Therefore, when POs for terminal devices using different slices are overlapped, the terminal devices may still determine whether their own paging messages are sent or not, and the paging messages which do not belong to them are prevented from being frequently read.

In one or more embodiments, POs when the access network device sends paging messages to terminal devices with different identifiers are the same or different.

In one or more embodiments, POs when the access network device sends paging messages to terminal devices in different paging groups are the same or different.

In one or more embodiments, the transceiver unit 410 is further configured to send system information to the terminal device, the system information containing a corresponding relationship between multiple paging groups and multiple network slices.

In one or more embodiments, responsive to that the corresponding relationship for multiple cells of the access network device is the same, the system information further includes information of the multiple cells.

It is to be understood that the network device 400 may correspond to a network device in the method 200, may implement operations implemented by the network device in the method 200 and, for simplicity, will not be elaborated herein.

Figure 5:
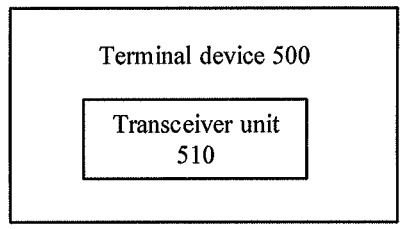
FIG. 5 is a schematic block diagram of a terminal device according to an embodiment of the disclosure.

FIG. 5 is a schematic block diagram of a terminal device 500 according to an embodiment of the disclosure. As illustrated in FIG. 5, the terminal device 500 includes a transceiver unit 510. Herein, the transceiver unit 510 is configured to receive a paging message sent by an access network device based on at least one network slice used by the terminal device.

Accordingly, the terminal device receives the paging message sent by the network device based on the network slice used by it, which, compared with reception of the paging message simultaneously sent to all network slices by the network device, may reduce a paging signaling overhead and avoid the terminal device frequently reading paging messages which do not belong to it.

In one or more embodiments, the terminal device further includes a determination unit, and the determination unit is configured to determine at least one paging group to which the terminal device belongs and which corresponds to the at least one network slice based on the at least one network slice used by the terminal device and corresponding relationship between multiple network slices and multiple paging groups. The transceiver unit 510 is specifically configured to receive indication information from the access network device, the indication information indicating a target paging group of the at least one paging group, and receive the paging message sent by the access network device, the paging message being a paging message sent to a terminal device of the target paging group by the access network device.

Accordingly, in the embodiments, the access network device selects a network slice to be firstly paged, sends the paging message to the terminal device supporting the network slice and simultaneously indicates the network slice. Therefore, when the network slice used by the terminal device includes the slice indicated by the access network device, the paging message sent by the access network device is detected, and then the terminal device may receive the paging message based on different network slices used by it and is prevented from frequently reading paging messages which do not belong to it.

In one or more embodiments, POs when terminal devices with different identifiers receive paging messages from the access network device are the same or different.

In one or more embodiments, POs when terminal devices in different paging groups receive paging messages from the access network device are the same or different.

In one or more embodiments, the transceiver unit 510 is further configured to receive system information from the access network device, the system information containing the corresponding relationship between the multiple paging groups and the multiple network slices.

In one or more embodiments, responsive to that the corresponding relationship for multiple cells of the access network device is the same, the system information further includes information of the multiple cells.

It is to be understood that the terminal device 500 may correspond to a terminal device in the method 300, may implement operations implemented by the terminal device in the method 300 and, for simplicity, will not be elaborated herein.

Figure 6:
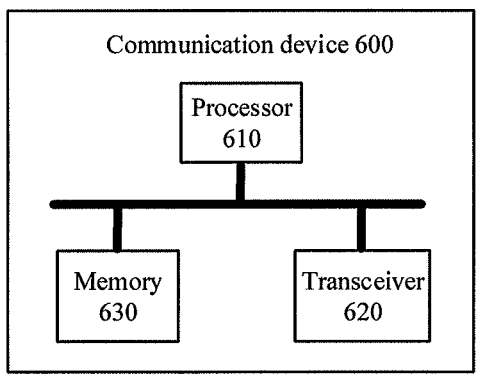
FIG. 6 is a schematic block diagram of a communication device according to an embodiment of the disclosure.

FIG. 6 is a schematic structure diagram of a communication device 600 according to an embodiment of the disclosure. As illustrated in FIG. 6, the communication device includes a processor 610, a transceiver 620 and a memory 630. Herein, the processor 610, the transceiver 620 and the memory 630 communicate with one another through an internal connecting path. The memory 630 is configured to store an instruction, and the processor 610 is configured to execute the instruction stored in the memory 630 to control the transceiver 620 to receive a signal or send a signal.

In one or more embodiments, the processor 610 may call a program code stored in the memory 630 to execute corresponding operations, executed by a network device, in the method 200 of the method embodiment. For similarity, no more elaborations will be made herein.

In one or more embodiments, the processor 610 may call the program code stored in the memory 630 to execute corresponding operations, executed by a terminal device, in the method 300 of the method embodiment. For similarity, no more elaborations will be made herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Disclosure Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 7:
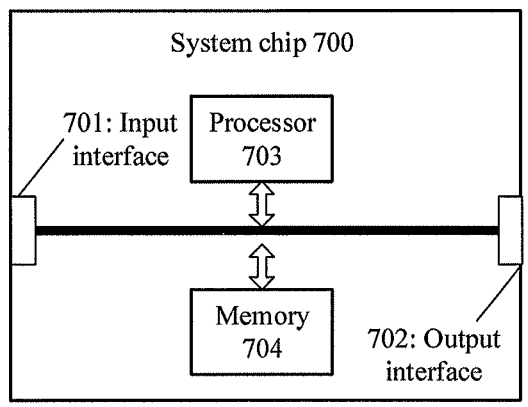
FIG. 7 is a schematic block diagram of a system chip according to an embodiment of the disclosure.

FIG. 7 is a schematic structure diagram of a system chip according to an embodiment of the disclosure. The system chip 700 of FIG. 7 includes an input interface 701, an output interface 702, at least one processor 703 and a memory 704. The input interface 701, the output interface 702, the processor 703 and the memory 704 are connected with one another through an internal connecting path. The processor 703 is configured to execute a code in the memory 704.

In one or more embodiments, when the code is executed, the processor 703 may implement the method 200 executed by a network device in the method embodiments. For simplicity, no more elaborations will be made herein.

In one or more embodiments, when the code is executed, the processor 703 may implement the method 300 executed by a terminal device in the method embodiments. For simplicity, no more elaborations will be made herein.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

It is further to be understood that term "and/or" in the disclosure is only an association relationship describing associated objects and represents that three relationships may exist. For example, A and/or B may represent three situations: i.e., independent existence of A, existence of both A and B and independent existence of B. In addition, character "/" in the disclosure usually represents that previous and next associated objects form an "or" relationship.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A paging method, comprising:
receiving, by a terminal device, a paging message sent by an access network device based on at least one network slice used by the terminal device, comprising:
determining, by the terminal device, at least one paging group to which the terminal device belongs and which corresponds to the at least one network slice based on the at least one network slice used by the terminal device and corresponding relationship between multiple network slices and multiple paging groups;
receiving, by the terminal device, indication information sent by the access network device, the indication information indicating a target paging group of at least one paging group; and
receiving, by the terminal device, the paging message sent by the access network device, the paging message being a paging message sent to a terminal device of the target paging group by the access network device;
receiving, by the terminal device, system information from the access network device, the system information containing the corresponding relationship between the multiple paging groups and the multiple network slices.

2. The method of claim 1, wherein Paging Occasions (POs) when terminal devices with different identifiers receive paging messages from the access network device are the same or different.

3. The method of claim 1, wherein Paging Occasions (POs) when terminal devices in different paging groups receive paging messages from the access network device are the same or different.

4. The method of claim 1, wherein responsive to that the corresponding relationship for multiple cells of the access network device is the same, the system information further comprises information of the multiple cells.

5. A network device, comprising a processor and a transceiver coupled with the processor:
wherein the transceiver is configured to send a paging message to a terminal device based on at least one network slice used by the terminal device;
wherein the network device is an access network device, and the processor is further configured to:
determine at least one paging group to which the terminal device belongs and which corresponds to the at least one network slice based on the at least one network slice used by the terminal device and corresponding relationship between multiple network slices and multiple paging groups; and
the transceiver is further configured to send the paging message to the terminal device based on the paging group to which the terminal device belongs;
wherein the processor is further configured to: select from the at least one paging group a target paging group to be paged, and control the transceiver to send a paging message to a terminal device of the target paging group; and
the transceiver is further configured to:
send indication information to the terminal device, the indication information indicating the target paging group; and
send system information to the terminal device, the system information containing the corresponding relationship between the multiple paging groups and the multiple network slices.

6. The network device of claim 5, wherein the processor is configured to:
responsive to that a delay requirement is lower than a threshold value, determine a first network slice, for which paging is to be firstly performed, of the at least one network slice used by the terminal device, and
the transceiver is configured to send the paging message to the terminal device through an access network device supporting the first network slice firstly.

7. The network device of claim 6, wherein the transceiver is configured to:
send the paging message to the terminal device through an access network device which supports a second network slice and does not support the first network slice.

8. The network device of claim 6, wherein the first network slice is:
a network slice supported by an access network device where the terminal device establishes a latest service, a network slice supported by an access network device where the terminal device is located after area updating, or a network slice with a highest priority.

9. The network device of claim 5, wherein the network device is a core network device, and the processor is further configured to:
responsive to that a delay requirement is higher than a threshold value, trigger to the transceiver to send the paging message to the terminal device simultaneously through access network devices supporting the at least one network slice.

10. A terminal device, comprising a processor and a transceiver coupled with the processor,
wherein the transceiver is configured to receive a paging message sent by an access network device based on at least one network slice used by the terminal device; and the processor is configured to determine at least one paging group to which the terminal device belongs and which corresponds to the at least one network slice based on the at least one network slice used by the terminal device and corresponding relationship between multiple network slices and multiple paging groups; and the transceiver is further configured to receive indication information from the access network device, the indication information indicating a target paging group of the at least one paging group, and receive the paging message sent by the access network device, the paging message being a paging message sent to a terminal device of the target paging group by the access network device;

wherein the transceiver is further configured to:

receive system information from the access network device, the system information containing the corresponding relationship between the multiple paging groups and the multiple network slices.

11. The terminal device of claim 10, wherein Paging Occasions (POs) used by terminal devices with different identifiers for receiving paging messages from the access network device are the same or different.

12. The terminal device of claim 10, wherein Paging Occasions (POs) used by terminal devices in different paging groups for receiving paging messages from the access network device are the same or different.

13. The terminal device of claim 10, wherein responsive to that the corresponding relationship for multiple cells of the access network device is the same, the system information further comprises information of the multiple cells.

* * * * *